(12) United States Patent
Evers et al.

(10) Patent No.: US 6,935,942 B1
(45) Date of Patent: Aug. 30, 2005

(54) FILLETING DEVICE

(75) Inventors: Reinhard Evers, Stockelsdorf (DE);
Karl-Heinz Diesing, Lübeck (DE);
Andreas Landt, Lübeck (DE); Conrad Torkler, Klein Zecher (DE)

(73) Assignee: Nordischer Maschinenbau Rud. Baader GmbH + CO KG, Lubeck (DE)

( * ) Notice: Subject to any disclaimer, the term of this patent is extended or adjusted under 35 U.S.C. 154(b) by 0 days.

(21) Appl. No.: 09/807,290

(22) PCT Filed: Oct. 16, 1999

(86) PCT No.: PCT/EP99/07867

§ 371 (c)(1),
(2), (4) Date: Jul. 16, 2001

(87) PCT Pub. No.: WO00/22933

PCT Pub. Date: Apr. 27, 2000

(30) Foreign Application Priority Data

Oct. 21, 1998 (DE) ................................ 198 48 498

(51) Int. Cl.[7] ............................................. A22C 21/00
(52) U.S. Cl. ...................... 452/157; 452/150; 452/156
(58) Field of Search ............................... 452/149, 150, 452/151, 152, 153, 154, 155, 156, 157, 160, 452/165, 127, 136, 170

(56) References Cited

U.S. PATENT DOCUMENTS 4,557,019 A * 12/1985 Van Devanter et al. ..... 452/157
4,567,624 A * 2/1986 van Mil ....................... 452/136
4,648,156 A * 3/1987 Meyn .......................... 452/136
4,688,297 A * 8/1987 Bartels ........................ 452/135
4,962,568 A * 10/1990 Rudy et al. .................. 452/157
5,021,024 A * 6/1991 Villemin et al. ............. 452/149

(Continued)

FOREIGN PATENT DOCUMENTS

| DE | 234785 | | 4/1986 |
|---|---|---|---|
| EP | 168865 | | 1/1986 |
| EP | 207553 | | 1/1987 |
| EP | 336162 | | 10/1989 |
| EP | 591741 | | 4/1994 |
| EP | 771530 | | 5/1997 |
| GB | 2129278 | * | 5/1984 |
| JP | 2-23100 | * | 2/1993 |

*Primary Examiner*—Peter M. Poon
*Assistant Examiner*—David J Parsley
(74) *Attorney, Agent, or Firm*—Mattingly, Stanger, Malur & Brundidge, P.C.

(57) ABSTRACT

Poultry carcasses are conveyed on saddles with their breastbone plate facing downwards to a scraping device having left and right scraping elements arranged adjacent to each other to simulate the contour of the approaching poultry carcass. The scraping elements are spaced apart by a signal from the control unit in relation to the individual width of the poultry carcass. Each scraping element has a sinew restraint that finds and restrains the tender sinew located in the region of the body joint, so that the scraping element can pass unhindered into the region between bone and meat and so obtain an optimum yield. A second scraping device, arranged essentially symmetrically to the direction of conveying, has left and right discs that are slidable by pivot levers to move on the corresponding part of the symmetrical wishbone in order to detach the meat connected to the wishbone.

10 Claims, 3 Drawing Sheets

U.S. PATENT DOCUMENTS

| | | | | |
|---|---|---|---|---|
| 5,984,770 A | * | 11/1999 | Asano et al. | 452/165 |
| 6,007,416 A | * | 12/1999 | Janssen et al. | 452/135 |
| 6,033,298 A | * | 3/2000 | Visser | 452/136 |
| 6,059,648 A | * | 5/2000 | Kodama et al. | 452/135 |
| 6,142,863 A | * | 11/2000 | Janssen et al. | 452/165 |
| 6,267,661 B1 | * | 7/2001 | Melville | 452/157 |
| 5,269,722 A | * | 12/1993 | Diesing et al. | 452/135 |
| 5,314,374 A | * | 5/1994 | Koch et al. | 452/136 |
| 5,372,539 A | * | 12/1994 | Kunig et al. | 452/136 |
| 5,492,502 A | * | 2/1996 | Hjorth | 452/170 |
| 5,545,083 A | * | 8/1996 | Bargele et al. | 452/136 |
| 5,697,837 A | * | 12/1997 | Verrijp et al. | 452/170 |
| 5,833,527 A | * | 11/1998 | Hazenbroek et al. | 452/170 |

* cited by examiner

FILLETING DEVICE

BACKGROUND OF THE INVENTION

1. Field of the Invention

The invention relates to a device and a method for removing the fillets from the eviscerated carcasses of poultry whose extremities have been detached.

2. Description of the Related Art

From EP A1 168 865 is known a device of this kind which is designed to remove the head portion of the wishbone (clavicula), wherein this operation is however before a filleting process whose result is a double fillet including the breast meat in the form of outer and inner fillets. With this device, the poultry carcasses present as front halves are mounted on the saddles of a rotationally driven conveyor, so that the saddle horn extends into the neck opening and the breast portion faces upwards. Filleting of the poultry carcass being conveyed with the neck opening in front is effected on the lower run of the device and begins with retention of the breast meat and hence stripping thereof from the wishbone to the breastbone (sternum) and is continued by a scraping tool which is adapted to the shape of the poultry carcass and, by penetration between skeleton and meat, causes separation of the meat up to the keel of the breastbone (crista sterni). By means of scraping fingers which then follow, detachment from the flanks of the breastbone is effected in its region of transition to the breastbone plate (corpus sterni) and finally complete separation of the double fillet by means of rotationally driven peeling belts. A further practical example of this state of the art provides as the first filleting tool a pair of milling rollers which lift the fillet meat located in the region of the ribs off the skeleton. Behind this tool is a scraping tool after the fashion of the one described above, which causes separation of the meat up to the keel of the breastbone. Complete separation of the double fillet is finally again undertaken by a tool consisting of rotationally driven peeling belts. From EP-A1 207 553 is known a further device for recovery of the meat from poultry carcasses in the form of double fillets. Here too the starting product is the front half of a poultry carcass which is inverted over the saddle horn of a saddle which forms part of a revolving conveyor. On inversion, the wing joints and hence the points of application of the wishbone are kept forced inwards, and the poultry carcass is thus supplied to the filleting tools which are arranged along the lower run of the conveyor and recover the fillet meat essentially by pushing it off. In the recovery of such fillets from poultry carcasses, unfortunately e.g. due to the different geometries of the naturally grown carcasses it is not possible to obtain an optimum of fillet meat at the same time as a visually pleasing product.

BRIEF SUMMARY OF THE INVENTION

It is now the object of the present invention to increase the yield of fillet meat, at the same time with a visually pleasing product.

The object is achieved according to the invention by the fact that a device for removing the fillets from the eviscerated carcasses of poultry whose extremities have been detached, which includes at least one measuring device for measuring the individual dimensions of the carcass, at least one control unit and at least one scraping device, wherein the measuring device is connected via the control unit to the at least one scraping device for the purpose of communicating.

A development according to the invention provides that the device for removing the fillets from the eviscerated carcasses of poultry whose extremities have been detached includes at least one measuring device for measuring the individual dimensions of the carcass, at least one control unit and at least two scraping devices, wherein the measuring device is connected via the control unit to the scraping devices for the purpose of communicating.

In another development according to the invention it is provided that at least one scraping device comprises an element for pulling back the tender sinew.

Further it may be provided according to the invention that at least one scraping device comprises at least two disc-like scraping elements.

A development according to the invention provides that at least one scraping device comprises at least two disc-like scraping elements simulating the contour of the poultry carcasses.

In another development according to the invention it is provided that the disc-like scraping elements are of rotatable construction.

Further it may be provided according to the invention that the disc-like scraping elements are of pivotable construction such that the circumferential surfaces of their discs are arranged so that they can be rolled over the wishbone from the body joint of the poultry carcass.

A development according to the invention provides that in front of each scraping device in the direction of conveying is arranged at least one measuring device.

In another embodiment according to the invention it is provided that there is provided a poultry processing device including at least one drivable conveyor which comprises at least one saddle for receiving the poultry, wherein a device for removing the fillets from the eviscerated carcasses of poultry whose extremities have been detached according to one or more of the above-mentioned claims is used.

Further it may be provided according to the invention that a poultry filleting method is provided, wherein one of the devices described hereinbefore is used.

BRIEF DESCRIPTION OF THE DRAWINGS

A practical example of the device according to the invention is described in more detail with the aid of the drawings. They show.

DETAILED DESCRIPTION OF THE INVENTION

Figure 1:
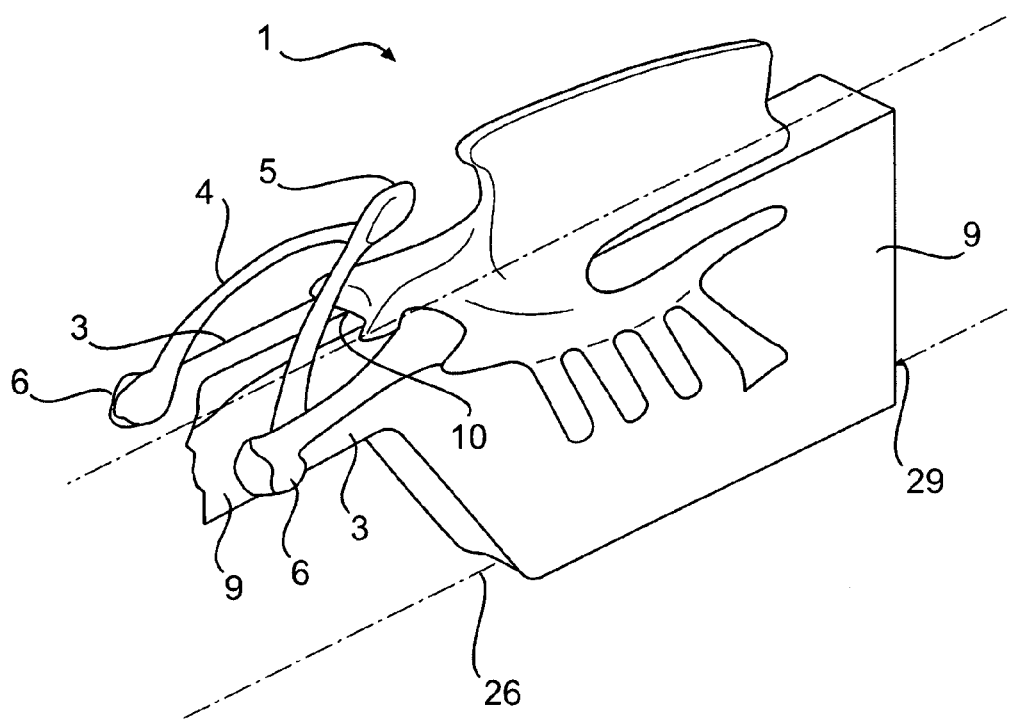
FIG. 1 a stripped view of the poultry carcass

In FIG. 1 is shown part of a poultry carcass 1 with reference to its bone structure which essentially consists of a breastbone 2, from which the coracoid bones 3 extend forwards, or in the direction of conveying 29. The wishbone 4, which extends as far as the wishbone head 5, is connected by the body joints 6 to the coracoid bones 3. This poultry carcass 1 is mounted on a saddle 9 which is in turn fixed in a frame, not shown in more detail, of a device for recovery of the breast meat from slaughtered poultry on an endlessly rotating conveyor 26. The part of the poultry carcass 1 which is shown in FIG. 1 is produced by an oblique cut transversely through the poultry carcass 1, wherein the cut is made while separating the pelvis with the legs and while cutting through the vertebral column roughly parallel to the ribs connected to the vertebral column.

Figure 2:
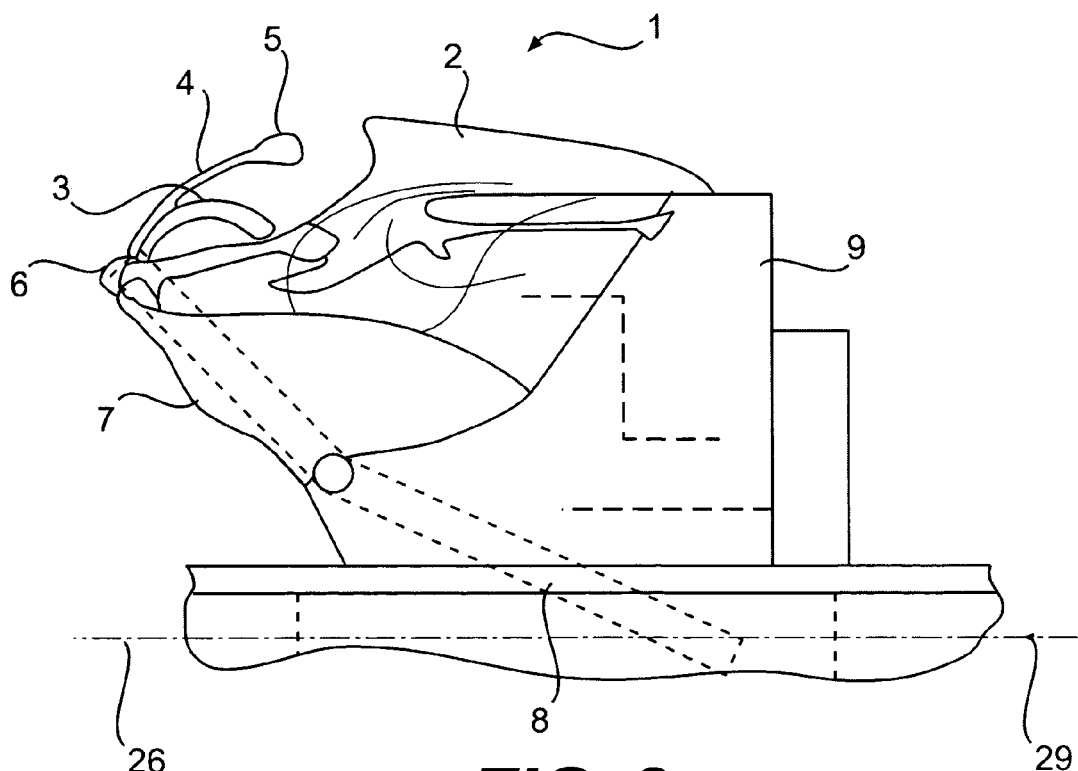
FIG. 2 a simplified side view of a poultry carcass on a saddle with activated clamping lever FIG. 3 a side view of a detail of a poultry processing device FIG. 4 a top view according to FIG. 3.

In FIG. 2 is shown a poultry carcass 1 on a saddle 9 in a side view, the poultry carcass 1 being pressed against the saddle 9 by means of the activated clamping lever 8. The inner contour of the breastbone plate 10 rests on the saddle 9. Essentially the poultry carcass 1 consists of the breastbone 2, from which the coracoid bones 3 extend in the direction of the body joints 6. The wishbone 4, which extends as far as the wishbone head 5, is connected to the coracoid bones 3 by the body joints 6 to which are also attached the scapulae 7. The poultry carcass 1 is mounted on a saddle 9 which is fixed in a frame, not shown in more detail, of a device for recovery of the breast meat from slaughtered poultry on an endlessly rotating conveyor 26.

Figure 3:
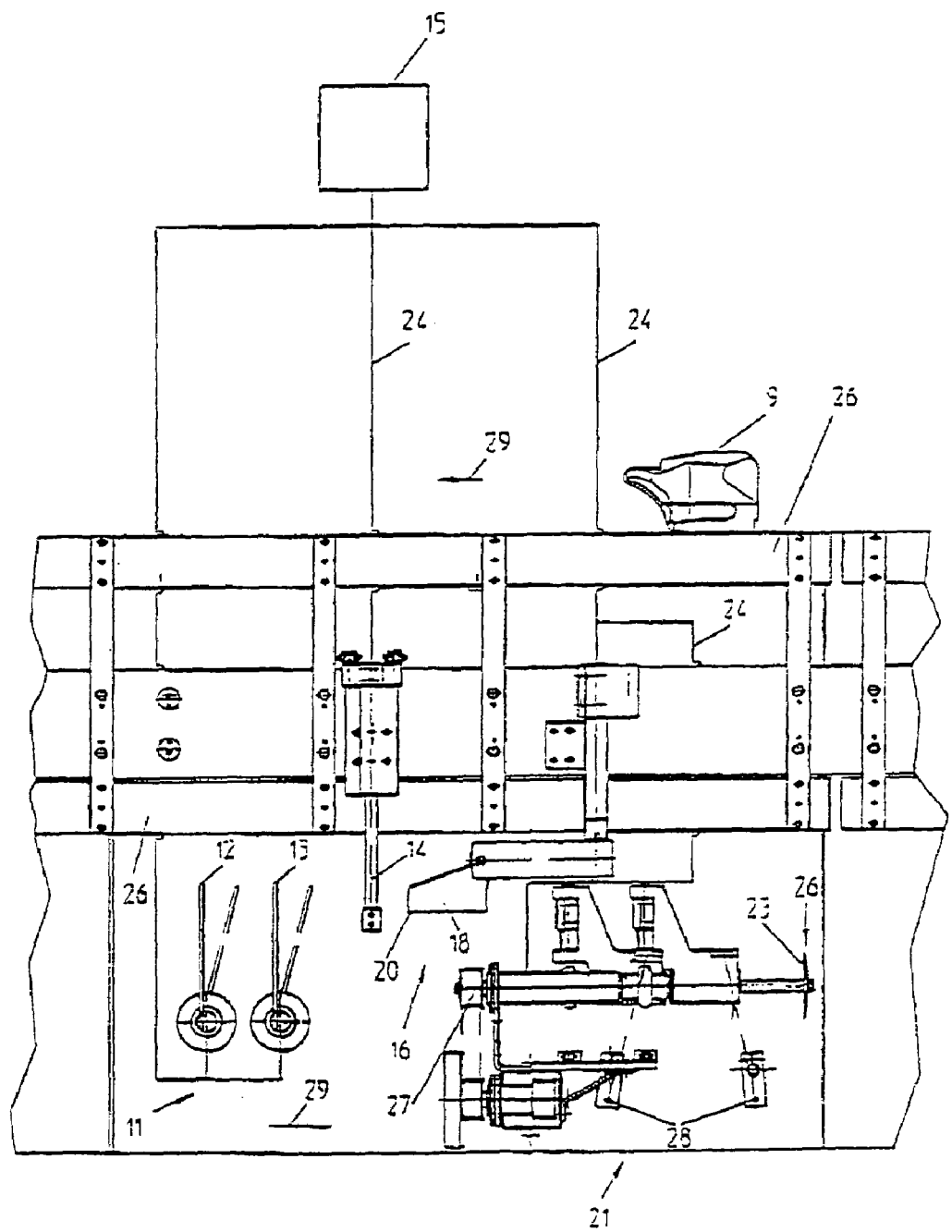

In the view according to FIG. 3 can be seen a side view of a poultry processing device.

The poultry carcass, not shown, which as described in FIGS. 1 and 2 is located on the saddles 9 arranged at regular intervals on the endlessly rotating conveyor 26, passes with its breastbone plate facing downwards into the input region of the measuring device 11.

This is because the arrangement of the device for removing the fillets selected in the embodiment shown is mounted below the endlessly rotating conveyor 26. In this way the ultimately removed fillet drops, assisted by gravity, into a collecting vessel suitably arranged below the device. In the region of the measuring device 11 the poultry carcass which is moved by means of conveyor 26 must successively pass in the direction of conveying 29 through a first measuring element 12 and a second measuring element 13, wherein the measuring element 12 is important for detection of one body joint, and the measuring element 13 is important for detection of the other body joint. As can be seen from FIG. 1, the body joints 6 are arranged essentially parallel and adjacent to each other in one plane, so that it follows that the measuring elements 12 and 13 are mounted with offset tracks according to the distance between the body joints 6. After the measuring elements 12 and 13, the poultry carcass passes through a third measuring element 14 which consists of two detecting parts or elements. These two elements are arranged in one plane and resemble double swing doors. The signals obtained individually from the measuring elements just described in relation to the respective dimensions of the poultry carcasses are transmitted directly to a control unit 15 by means of the signal wires 24 and serve essentially for individual identification of the position of the body joints of each individual poultry carcass which passes by means of conveyor 26 into the region of the device for recovery of the fillet. But it is also possible with the device shown to make statements regarding the height, width and length of the poultry carcass. The control unit 15 now signals the arrival of each poultry carcass, but in particular the position of the body joints 6 of the respective poultry carcass, to the first scraping device 16. This scraping device 16 consists of a left scraping element 17 and a right scraping element 18, wherein these scraping elements 17, 18 arranged adjacent to each other essentially simulate the contour of the poultry carcass from the viewpoint of the approaching poultry carcass. The scraping elements 17, 18 are arranged pivotably relative to each other, so that they can be spaced apart e.g. by means of a signal from the control unit 15 in relation to the individual width of the poultry carcass. The left scraping element 17 has a left sinew restraint device 19 which is intended to find and restrain the tender sinew located in the region of the body joint, so that the scraping element can pass unhindered into the region between bone and meat and so obtain an optimum yield. The right scraping element 18 has a right sinew restraint device 20 which is intended to find the corresponding tender sinew located on the opposite body joint. After the first scraping device is located a second scraping device 21 which, arranged essentially symmetrically to the direction of conveying, comprises a left disc 22 and a right disc 23 which are preferably made of metal, wherein these discs 22, 23 can be driven with a disc drive 27. These discs 22, 23 are slidable by means of disc pivot levers 28 in such a way that, the moment the control unit 15 indicates via the signal wires 24 the appearance of the body joints 6 of the poultry carcass within range of the second scraping device, the circumferential surface 25 of the discs 22, 23 moves towards the corresponding body joint and abuts against it. In the course of the movement of the poultry carcass caused by the conveyor 26, the discs 22, 23 move on the corresponding part of the symmetrical wishbone 4 towards its wishbone head 5 in order to detach the meat connected to the wishbone 4. After reaching the wishbone head, the rotating discs 22, 23 are steered out of direct range of the poultry carcass. In a special embodiment the discs 22, 23 are blunt, particularly in the region of their circumferential surface 25.

In a further alternative embodiment it is provided that in the region between first scraping device 16 and second scraping device 21 is arranged a further measuring device 11 for checking the carcass coordinates, which may possibly have changed after a processing operation.

In another alternative embodiment it is provided that the scraping devices 16, 21 already described above are arranged in the reverse order, so that the poultry carcass passes through first the scraping device 21 and then the scraping device 16, wherein here too the additional alternative that a further measuring device is arranged between the scraping devices 21, 16 is conceivable.

Figure 4:
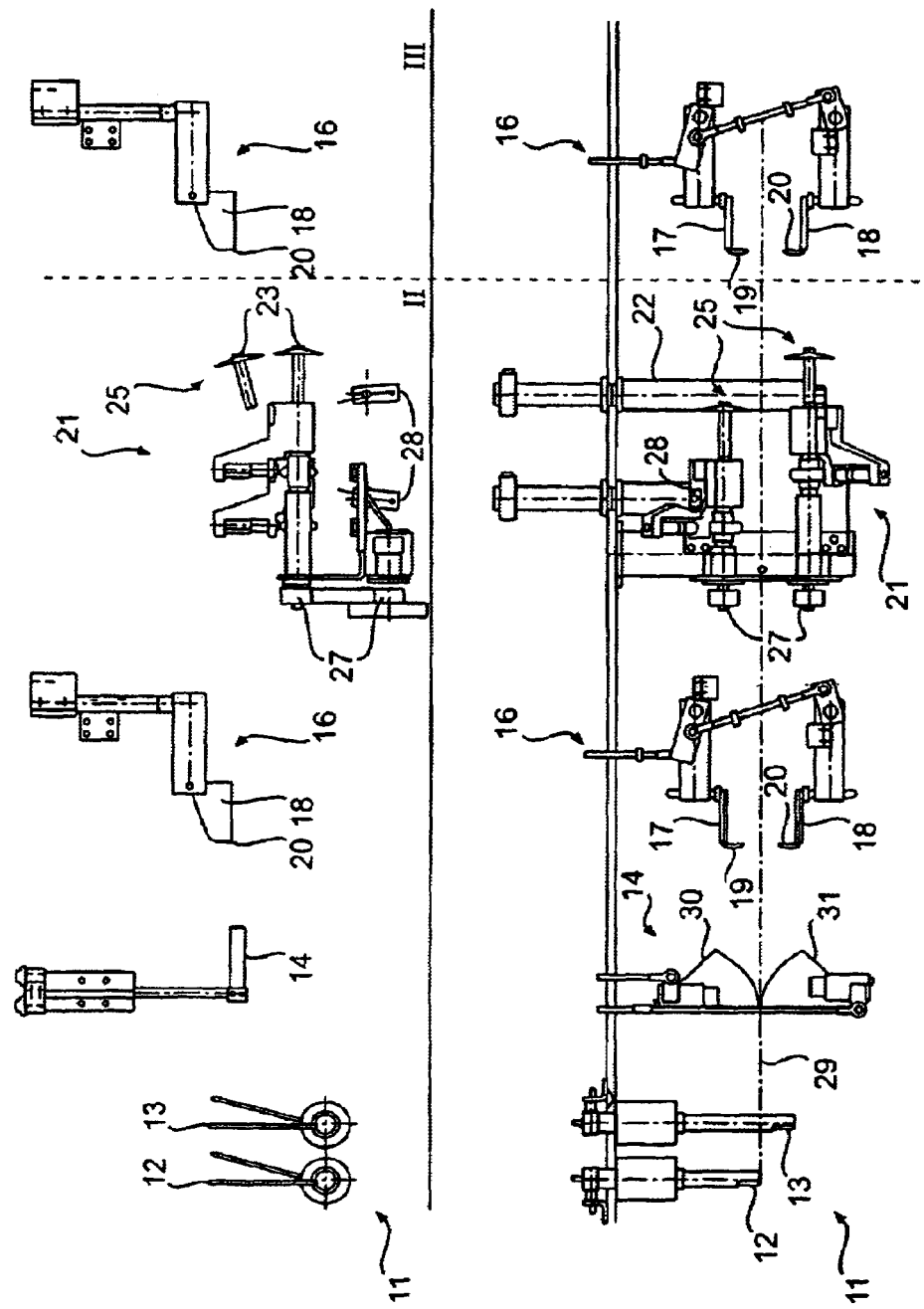

In the view according to FIG. 4 can be seen a side view and a top view of a poultry processing device according to FIG. 3. In the region of the measuring device 11, the poultry carcass which is moved with the conveyor 26 shown in FIG. 3 must pass successively in the direction of conveying 29 through a first measuring element 12 and a second measuring element 13, wherein the measuring element 12 is important for detection of one body joint 6, and the measuring element 13 is important for detection of the other body joint 6, which are shown in FIG. 1. As can be seen from FIG. 1, the body joints 6 are arranged essentially parallel and adjacent to each other in one plane, so that it follows that the measuring elements 12 and 13 are mounted with offset tracks according to the distance between the body joints 6, which can be seen in particular in FIG. 4 II. After the measuring elements 12 and 13, the poultry carcass passes through a third measuring element 14 which consists of two detecting parts or elements, the left detecting part or element 30 and the right detecting part or element 31. These two elements are arranged in one plane and resemble double swing doors. The signals obtained individually from the measuring elements just described in relation to the respective dimensions of the poultry carcasses are transmitted directly to a control unit 15 by means of the signal wires 24 shown in FIG. 3 and serve essentially for individual identification of the position of the body joints as well as the volume and external dimensions of each individual poultry carcass which passes by means of conveyor 26 into the region of the device for recovery of the fillet. The control unit 15 which can also be seen in FIG. 3 now indicates the arrival of each poultry carcass, but in particular the position of the body joints 6 of the respective poultry carcass, to the first scraping device 16. This scraping device 16 consists of a left scraping element 17 and a right scraping element 18. The scraping elements 17, 18 are arranged pivotably relative to each other, so that they can be spaced apart e.g. by means of a signal from the control unit 15 in relation to the individual width of the poultry carcass. The left scraping element 17 has a left sinew restraint device 19 which is intended to find and restrain the tender sinew located in the region of the body joint, so that the scraping element can pass unhindered into the region between bone and meat and so obtain an optimum yield. The right scraping element 18 has a right sinew restraint device 20 which is intended to find the corresponding tender sinew located on the opposite body joint. After the first scraping device is located a second scraping device 21 which, arranged essentially symmetrically to the direction of conveying, comprises a left disc 22 and a right disc 23, wherein these discs 22, 23 can be driven with a disc drive 27 which can be driven with a drive belt, not shown in more detail, by a motor, also not shown. These discs 22, 23 are slidable by means of disc pivot levers 28 in such a way that, the moment the control unit 15 indicates via the signal wires 24 the appearance of the body joints 6 of the poultry carcass within range of the second scraping device, the circumferential surface 25 of the discs 22, 23 moves towards the corresponding body joint and abuts against it. In the course of the movement of the poultry carcass caused by the conveyor 26, the discs 22, 23 move on the corresponding part of the symmetrical wishbone 4 towards its wishbone head 5 in order to detach the meat connected to the wishbone 4. After reaching the wishbone head, the rotating discs 22, 23 are again steered out of direct range of the poultry carcass. In a special embodiment the discs 22, 23 are blunt, particularly in the region of their circumferential surface 25.

In another alternative embodiment according to FIG. 4 III it is provided that the scraping devices 16, 21 already described above are arranged in the reverse order, so that the poultry carcass passes through first the scraping device 21 and then the scraping device 16, wherein here too the additional alternative that a further measuring device is arranged between the scraping devices 21 and 16 is conceivable. In a further alternative embodiment it is provided that the measuring device 11 has a photooptical element, e.g. a camera which in conjunction with a processor unit and a mathematical process, such as for example triangulation, determines volume and carcass data, or its coordinates, e.g. the wishbone shape.

What is claimed is:

1. A device for removing fillets from eviscerated carcasses of poultry whose extremities have all been totally detached therefrom, comprising:
    at least one measuring device for measuring individual dimensions in three dimensions of an eviscerated poultry carcass, whose extremities have all been totally detached therefrom, from the outside of the carcass to find a starting position for loosening the fillets from the carcass, the measuring device comprising:
    a first element having means for detecting a length and height of a first body joint point,
    a second element having means for detecting a length and height of a second body joint point,
    wherein the first element and the second element are offset in a transport direction of the carcass, and
    a third element which is mounted behind the first and second elements and consists of two detecting parts having means for detecting a width of the first and second body joint points, respectively,
    at least one control unit,
    at least one scraping device,
    and means connecting the measuring device via the control unit to the at least one scraping device for the purpose of communicating poultry carcass measuring data to the scraping device, the at least one scraping device including a disc-like scraping element.

2. A device according to claim 1, wherein two scraping devices are provided.

3. A device according to claim 1, wherein said at least one scraping device comprises at least two disc-like scraping elements.

4. A device according to claim 1, wherein said at least one scraping element is of rotatable construction.

5. A device according to claim 1, wherein said at least one scraping device includes an element for pulling back tender sinew of the carcass.

6. A device according to claim 4, wherein said disc-like scraping element is of pivotable construction such that a circumferential surface of its disc is arranged so that it can be rolled over a wishbone from a body joint of the poultry carcass.

7. A device according to claim 4, wherein in front of said at least one scraping device in a direction of conveying is arranged at least one measuring device.

8. A method for removing fillets from eviscerated carcasses of poultry whose extremities have all been totally detached therefrom, including the steps of:
    introducing an eviscerated carcass of poultry, whose extremities have all been totally detached therefrom, into a device for removing fillets from the carcass;
    detecting individual poultry carcass dimensions in three dimensions from an outside of the carcass, to find a starting position for loosening the fillets from the carcass, by recording poultry carcass-specific data by a first element having means for detecting a length and height of a first body joint point, by a second element having means for detecting a length and height of a second body joint point, wherein the body joint points are detected one after another, and by a third element having means for detecting a width of the first and second body joints which is mounted behind the first and second elements in a transport direction;
    controlling at least one scraping device as a function of the detected specific carcass data and positioning scraping elements on previously determined body joint points;
    subsequently detaching the fillets from a poultry carcass skeleton by at least one scraping element which is formed in a disc shaped construction, and
    completely detaching the fillets by subsequent scraping tools.

9. A method according to claim 8, wherein detection of poultry carcass dimensions is effected by mechanical sensing of body joint points.

10. A method according to claim 8, wherein two sides of the poultry carcass are processed one after the other.

* * * * *